United States Patent [19]
Huber et al.

[11] Patent Number: 5,554,230
[45] Date of Patent: Sep. 10, 1996

[54] LOW DEW POINT GAS GENERATOR COOLING SYSTEM

[75] Inventors: Michael J. Huber, Toledo; Jerry P. Jason, Maumee; Garry W. Barbee, Waterville, all of Ohio

[73] Assignee: Surface Combustion, Inc., Maumee, Ohio

[21] Appl. No.: 456,490

[22] Filed: Jun. 1, 1995

[51] Int. Cl.⁶ .................................................. C23C 8/20
[52] U.S. Cl. ........................... 148/208; 148/206; 266/257
[58] Field of Search ........................... 148/206, 208, 148/216, 218; 266/257, 81, 87; 432/152, 198, 199

[56] References Cited

U.S. PATENT DOCUMENTS

| | | |
|---|---|---|
| 2,786,741 | 3/1957 | Heubler et al. |
| 2,852,095 | 9/1958 | DeCoriolis et al. |
| 2,897,158 | 7/1959 | Sanzenbacher et al. |
| 3,208,830 | 9/1965 | Knight et al. |
| 4,236,941 | 12/1980 | Main, Jr. ................................. 148/16.5 |
| 4,317,687 | 3/1982 | Kaspersma et al. ..................... 148/218 |
| 4,386,972 | 6/1983 | Knight ..................................... 148/218 |
| 4,805,881 | 2/1989 | Schultz et al. .......................... 266/257 |
| 5,348,592 | 9/1994 | Garg et al. ............................... 148/208 |
| 5,364,476 | 11/1994 | Poor et al. ................................ 148/27 |

*Primary Examiner*—Scott Kastler
*Attorney, Agent, or Firm*—Frank J. Nawalanic

[57] ABSTRACT

A drying system is disclosed for drying wet gases, typically produced by a gas generator to dew points less than 32° F. The system uses a refrigeration cycle having a single compressor to dry the wet gas in a first evaporator while simultaneously defrosting the ice buildup on a second evaporator. The cycle then switches from the first evaporator to the second evaporator after the second evaporator is defrosted. The switching is preceded by a changeover phase in which cooled refrigerant is pulsed to the defrosted evaporator and both evaporators go on line for a short time before the system phase change occurs thus assuring control of the dried gas temperature while avoiding shock to the refrigeration system.

26 Claims, 5 Drawing Sheets

LOW DEW POINT GAS GENERATOR COOLING SYSTEM

This invention relates generally to gas generators and more particularly to a cooling arrangement for drying the gas produced by a gas generator to a low dew point.

The invention is particularly applicable to and will be described with specific reference to an arrangement for cooling or drying gases produced by an exothermic gas generator for use in special heat treating applications such as annealing applications with controlled decarburization. However, those skilled in the art will recognize that the invention has broader applications, and is not limited to gases produced by exothermic gas generators as opposed to gases produced by other types of gas generators, and indeed can be applied to any process, (chemical, petroleum or food) in which a dry gas, no matter how produced, is required.

INCORPORATION BY REFERENCE

The following U.S. patents are incorporated by reference herein and made a part hereof so that the specifications of this patent need not describe in detail what is conventionally known in the trade. The U.S. patents incorporated by reference do not, per se, form any part of the present invention.

| U.S. Pat. No. | Date | Inventor | Title |
| --- | --- | --- | --- |
| 4,805,881 | 2/21/89 | Schultz et. al | Internal Gas Generator for Heat Treating Furnace |
| 3,208,830 | 9/21/65 | Knight et. al | Atmosphere Gas Generator |
| 2,786,741 | 3/26/57 | Huebler et. al. | Metallurgical Gas Generator |
| 2,712,981 | 7/12/55 | Beggs | Gas Generator and Process for Producing Dry Gas |

BACKGROUND

Gas generators are refined, mature products which react a hydrocarbon fuel (typically methane) with an oxidant (typically air) to produce a gas stream having a defined range of components. Generally speaking, generators can be classified as exothermic or endothermic depending on whether the reaction between hydrocarbon fuel and oxidant is viewed as liberating heat (exothermic) or consuming heat (endothermic). Typically, an endothermic generator passes the fuel and oxidant through a packed catalyst bed and reference can be had to Schultz U.S. Pat. No. 4,805,881 for a discussion of the reactions and heat balances through the bed. The same type of reactions occur in exothermic gas generators which do not, generally speaking, have a catalyst bed. Reference can be had to Knight U.S. Pat. No. 3,208,830 for a showing of an exothermic gas generator design still in commercial use today.

Generally, the gas composition of air is fixed and principally comprises oxygen and nitrogen which will produce when reacted with a hydrocarbon fuel, such as natural gas, a resultant gas mixture (products of combustion) having varying percentages of certain gases depending upon the ratio of air to fuel which is reacted. When the air to natural gas is fixed at a ratio of about 9.2 parts of air to 1 part of natural gas (by volume) stoichiometric combustion occurs which means the products of combustion contain little if any combustibles, i.e., $H_2$ and CO. In the trade, gas generators are typically supplied with a variable turn-down ratio so that the gas generator can be operated "rich" or "lean". Turndown ratio simply means the ratio of air to fuel. "Lean" or "excess air" means operating the generator at close to stoichiometric conditions and "rich" means operating the generator at less than stoichiometric ratios. It is of course appreciated, that the products of combustion in turn will undergo equilibrium at whatever temperature they are at (and while undergoing equilibrium will in turn experience certain kinetic reactions) which in turn will affect the percentages of certain gases which make up the products of combustion. In the trade and as used in this specification, products of combustion means the resultant gas initially produced when the hydrocarbon fuel is reacted or combusted with an oxidant at its reaction temperature. When the products of combustion achieve compositions and composition percentages at equilibrium at a desired temperature, the gas is referred to as a product gas.

Endothermic gas generators are typically operated very rich at low air to fuel ratios of about 2.5 to 1. The water gas shift reaction is controlled to equilibrium in the catalyst bed to produce a product gas, such as American Society of Metal Class 300 carrier gas which has trace amounts of water vapor. As a practical matter the invention has little application for endothermic gas generators when used to produce gases for effecting heat treating processes such as carburizing.

Exothermic gas generators, because of the exothermic reaction, are typically operated at higher air-fuel ratios (from a rich condition of anywhere between about 5–7 parts of air to 1 part of natural gas to stoichiometric) then endothermic gas generators and produce products of combustion having a relatively high, initial percentage of water vapor (about 12–15%), and is a "wet gas". The gases produced are classified as inert gases because they normally do not contain combustibles in that amount produced by endothermic gas generators. However, when exothermic generators are operated "rich", they can produce combustibles as high as 20%. This is desirable for annealing heat treat processes in which the furnace atmosphere is desired to have some hydrogen which is beneficial to the annealing process while possessing the ability to produce an inert gas for purging purposes (also required not only in the annealing process but in the operation of any furnace).

In the conventional exothermic gas generator the gas is immediately cooled from its combustion temperature in excess of about 2,800° F. to a temperature of about 100° F. by passing through a water spray within the generator such as shown in the Knight patent followed by further passing through a water tower or chiller. The composition of the product gas is optionally further changed by cooling or drying the gas further by subsequently passing the 100° F. gas over refrigeration coils to lower the dew point (temperature at which condensation of water vapor in the product gas takes place) to about 40° F. A typical product gas composition by volume percent produced by an exothermic gas generator marketed by the assignee Surface Combustion under the brand name DX® operated at lean and rich conditions is set forth in the published table below.

| | INERT | | RICH | |
| --- | --- | --- | --- | --- |
| DX® | 100° F. D.P. | 40° F. D.P. | 100° F. D.P. | 40° F. D.P. |
| $CO_2$ | 10.4 | 11.0 | 4.7 | 5.0 |
| CO | 0.5 | 0.5 | 9.4 | 10.0 |

-continued

|      | INERT |  | RICH |  |
| --- | --- | --- | --- | --- |
| DX ® | 100° F. D.P. | 40° F. D.P. | 100° F. D.P. | 40° F. D.P. |
| $H_2$ | 0.5 | 0.5 | 9.4 | 10.0 |
| $H_2O$ | 6.5 | 0.8 | 6.5 | 0.8 |
| $N_2$ | 82.1 | 87.2 | 69.6 | 73.8 |

In general summary, the products of combustion which are initially formed at temperatures in excess of about 2,800° F. are cooled in the generator and water towers to about 100° F. and then passed through refrigeration coils where the water vapor condenses on refrigeration coils to dew points of about 40° F. There are special heat treat processes where the products of combustion are desired to be dried to dew points less than 40° F. and preferably less than or about 20° F..

Because of the phase change of water to ice at temperatures of 32° F. it is not feasible to use conventional refrigeration cycles to achieve drying of the "wet" products of combustion to dew points lower than 32° F. This is because ice from the water vapor condenses on the refrigerant coils limiting the temperature at which the product gas can be cooled to 32° F. The refrigerant system then has to operate in a defrost mode to remove the ice.

Within the gas generator art, it is conventionally known to pass the gas either through alternately used chambers of a known desiccant material such as alumina or through alternately used molecular sieve beds. In either of these arrangements, one of the beds is "rejuvenated" or "reclaimed" by boiling off the saturated water and other impurities while the other bed is on-line drying the gas to temperatures where the dew point of the gas is less than 32° F. When the on-line bed becomes contaminated from the products of combustion, the system switches to the reclaimed bed during which time the on-line bed (desiccant or molecular sieve) is reclaimed. An example of such a system is set forth in Beggs U.S. Pat. No. 2,712,981 incorporated by reference herein.

In practice such systems as molecular sieve and desiccant dryers have been found to have an inherent and immediate drop off in performance as they become saturated with water and other impurities requiring reclamation to boil off the water etc., at increasingly frequent cycles. Eventually the arrangement tends to approach a continuous type of cycle requiring replacement of the desiccant or molecular sieves. Significantly, as a function of time, the reclamation or boiling off phase simply does not completely refurbish the absorbent material in the dryer and the performance curve of the system shifts. This makes control of the system, ie., the dew point of the gas, increasingly difficult to attain and maintain.

SUMMARY OF THE INVENTION

Accordingly, it is a principle object of the invention to provide a drying system, method and apparatus, for drying wet gases to dew points less than the dew point at which water freezes which, in theory, operates indefinitely at a constant, periodic cycle.

This object along with other features and advantages of the system is achieved by a method for producing from a wet gas stream a continuous stream of dried gas having a dew point less than about or equal to 20° F. which includes the steps of providing i) a single compressor for compressing a conventional refrigerant gas to produce a compressed, heated refrigerant gas stream, ii) a condenser for liquefying the compressed heated refrigerant gas stream to produce a cooled refrigerant stream, iii) first and second evaporator coils with associated expansion valves, and iv) valves for porting the refrigerant streams between the evaporators and the wet gas stream over the evaporators. The method repeatedly performs a periodic, refrigeration cycle in which a) during a first phase of the cycle, the wet gas is passed over the first evaporator which functions as an active evaporator through which the cooled refrigerant stream passes for drying the wet gas passing over the first evaporator while a portion of the heated compressed refrigerant stream is passed through the second evaporator which is in an inactive state for defrosting same and b) during a second phase of the cycle, the wet gas is ported over the second evaporator acting as an active evaporator through which the cooled, refrigerant stream passes for drying the wet gas while a portion of the heated compressed refrigerant in passed through the first evaporator functioning as an inactive evaporator for defrosting same whereby the sensible heat of the wet gas is used by the refrigeration system to defrost the inactive evaporator reducing the water usage (and expense) otherwise required by the condenser while maintaining a fundamental, heat equilibrium balance for the refrigeration and defrost modes of the cycle.

The method further includes during each numbered cycle phase the step of metering a portion of the heated compressed refrigerant stream into the cooled refrigerant stream ported into the active evaporator and the metering rate of the heated refrigerant stream is periodically reduced from the beginning to the end of each cycle phase as ice accumulates on the active evaporator whereby the wet gas is continuously dried to a generally constant dew point throughout each portion of the cycle. Simultaneously, the rate at which the heated compressed refrigerant is passed through the inactive evaporator is periodically reduced to permit rapid defrosting of the inactive evaporator without overheating the inactive evaporator.

In accordance with an important feature of the invention, the method further includes the step of performing a changeover phase before switching from one numbered cycle phase to the other by i) stopping the flow of heated refrigerant stream through the inactive evaporator and ii) thereafter pulsing a portion of the cooled refrigerant stream through the inactive evaporator while maintaining the flow of the cooled refrigerant stream through the active evaporator for a set time period at the end of which the inactive evaporator becomes active by porting a portion of the wet gas stream over the previously inactive evaporator while still maintaining the active evaporator active for a second set time period. At the end of the second set period, the system switches to the next numbered phase thereby avoiding variation in the dried temperature of the cooled gas during changeover.

In accordance with another aspect of the invention, the method of the invention periodically includes the step of increasing during the changeover phase, the time duration of the cooled refrigerant pulses until the pulse becomes continuous at which time the wet gas is only ported from one evaporator to the other whereby the load on the compressor is maintained fairly constant.

In accordance with still another feature of the invention the method further includes the step of directing a portion of the dried gas over the coils of the inactive evaporator during each numbered phase of the refrigeration cycle whereby ice is removed not only by heat transfer from within the coils of the inactive evaporator but also by moisture pick up from the dried gas circulating about the exterior of the coils of the inactive evaporator.

In accordance with another important aspect of the invention the entire cycle is controlled by sensing the temperature of the refrigerant stream immediately downstream of each evaporator and controlling i) the metering of the heated compressed refrigerant stream ii) the pulsing of the cooled, compressed refrigerant stream and iii) the porting of the wet gas stream from one evaporator to the other resulting in a stable and responsive control system.

In accordance with a separate but important feature of the invention, apparatus is provided for drying wet gases having dew points in excess of about 40° F. to dry gases having a dew point less than about 20° F. which includes a refrigeration system having a i) compressor for compressing any conventional, refrigerant gas to a heated, compressed refrigerant gas, ii) a condenser in fluid communication with the compressor for condensing the heated refrigerant gas to a cooled, liquid refrigerant, iii) first and second evaporators with associated expansion valves for drying the wet gas, and iv) a refrigerant valve mechanism for selectively porting the heated compressed refrigerant and the condensed refrigerant to the evaporators. The apparatus includes a single cooling tank having first and second compartments, each with an inlet and outlet and insulated from one another and in which the first and second evaporators, respectively, are disposed and each compartment has a cooling tank valve mechanism controlling which compartment and its associated evaporator receives the wet gas. A control arrangement regulates the cooling tank valve mechanism and the refrigeration valve mechanism for repeatedly performing the periodic first and second phase refrigeration cycle described above whereby the sensible heat of the wet gas is utilized by the refrigeration cycle to defrost the inactive evaporator.

In accordance with still another aspect of the invention, the apparatus includes the refrigeration system having a defrost conduit downstream of the compressor and upstream of the condenser in fluid communication with the first and second evaporators downstream of each evaporator's expansion valve and the refrigerant valve mechanism includes valves in the defrost lines regulated by the control arrangement. The control arrangement is effective to port the heated compressed refrigerant at a decreasing metered rate through the inactive evaporator for defrosting same while metering a portion of the heated compressed refrigerant into the cooled refrigerant of the active evaporator at a rate which decreases over the time period the active evaporator is cooling the wet gas, the decreasing rate being correlated to the ice buildup on the coils of the active evaporator so that the dew point of the dried gas remains relatively constant throughout the cycle. Still further the control arrangement is effective to cause pulsing of compressed refrigerant through the expansion valve of the inactive evaporator as described above to permit easy phase transition of the system without affecting the dew point of the dried product gas.

It is thus one of the major objects of the invention to provide a drying system for use in combination with a gas generator to reliably produce furnace atmospheres for certain heat treat processes such as processes requiring close control of decarburization of low carbon steels which heretofore was not possible with conventional gas generators.

In conjunction with the foregoing object, a more specific object of the invention is to provide a cooling system for a furnace atmosphere gas generator in which the conventional chilling tower is replaced by the refrigerant system of the present invention thus permitting the drying system to cool product gases to dew points less than 32° F. without increasing the cost of the system.

It is another object of the invention to provide a drying system for wet gases to produce dry gases at dew points of 20° F. or less for any number of uses which utilizes a single refrigeration system requiring only one compressor to dry the gas and further minimizes the sizing or capacity requirement of the refrigeration components to produce an economical, high capacity system.

Still another object of the invention is to provide a low dew point drying system for gases containing water vapor utilizing a refrigeration cycle in which the refrigerant is switched from one evaporator to another without subjecting the compressor to excessive loads or allowing the dew point of the dried gas to vary immediately before, after and during the switching.

Still another general object of the invention is to provide an improved refrigeration cycle for drying gases to low dew points.

Another more specific object of the invention is to provide a single, cooling tank for gases dried to low dew points in the above mentioned refrigeration cycle which provides an efficient, economical method for containing and valving the gas while it is dried.

A somewhat general object of the invention is to utilize in the refrigeration loop the sensible or latent heat of the wet gas cooled by the active evaporator to defrost the inactive evaporator thereby conserving energy either by decreasing water usage by the condenser if water cooled or electrical consumption through shorter fan cycles if the condenser is air cooled.

A still further general objet of the invention is to provide a drying system utilizing a periodic reclamation cycle for cooling wet gases to dew points less than 32° F. which can continuously operate without any decrease in drying performance over time.

Still yet another specific object of the invention is to provide a refrigeration type system for drying gases to dew points below the freezing temperature of water which is controlled solely by a single temperature measurement in a stable manner.

Still another object of the invention is to provide an economical system for drying gases produced by an exothermic gas generator to dew points below the freezing temperature of water.

These and other objects, features and advantages of the invention will become apparent to those skilled in the art upon reading and understanding the Detailed Description of the invention set forth below taken in conjunction with the drawings.

BRIEF DESCRIPTION OF THE DRAWINGS

The invention may take form in certain parts and in an arrangement of certain parts taken together and in conjunction with the attached drawings which form part of the invention and wherein.

DETAILED DESCRIPTION

Figure 1:
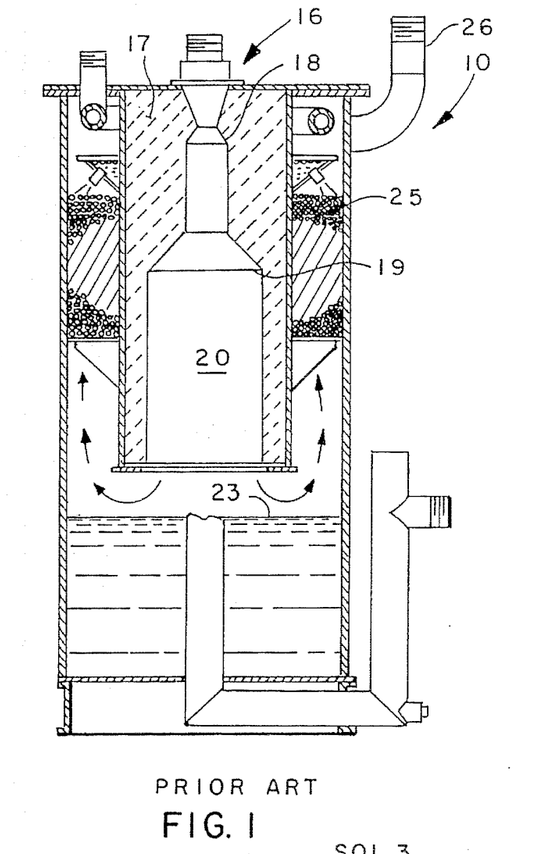
FIG. 1 is a prior art, longitudinally-sectioned view of an exothermic gas generator.
Figure 2:
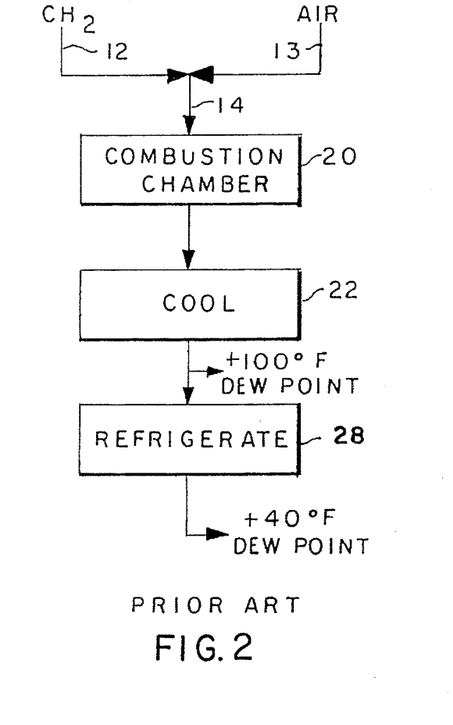
FIG. 2 is a prior art, process flow diagram of an exothermic gas generator drying system.

Referring now to the drawings wherein the showings are for the purposes of illustrating a preferred embodiment of the invention only and not for the purposes of limiting the same, there is shown in FIG. 1 a prior art exothermic gas generator 10 and in FIG. 2 a prior art process flow chart. As shown in FIG. 2, a hydrocarbon fuel, such as methane, is fed through a gas line indicated by reference numeral 12 and air is fed through an air line indicated by reference numeral 13 to a conventional valve train indicated by reference numeral 14 where the air and methane is mixed at preset and variable (i.e., turndown) ratios. The resulting combustible gas mixture is fed from valve train 14 into a burner 16 situated within gas generator 10. Burner 16 has cylindrical passages formed in a refractory block 17 as shown in FIG. 1. Burner operation is typical in that the combustible gas mixture is ignited at the frusto conical step identified by reference numeral 18 and the flame front stabilized at the step identified by reference numeral 19 and thorough combustion of the air and fuel mixture occur within combustion chamber 20. The gases immediately formed or produced by the reaction of air and fuel in combustion chamber 20 are termed "products of combustion". Reference should again be had to the Background discussion where it was explained that burner 16 could operate at various turndown ratios (varying ratios of air to gas) to produce "rich" or "lean" products of combustion and the percentages of the gases which make up the products of combustion vary depending upon the ratio of fuel and air introduced into burner 16. The products of combustion are at very high temperatures, well in excess of 2800° F. when they leave combustion chamber 20 and they are immediately subjected to cooling as indicated by cooling reference block 22 in FIG. 2 in the prior art. At that time products of combustion become a product gas.

Cooling is typically accomplished in what is essentially a two step process. In the first step cooling occurs within exothermic generator 10 followed by a second step in which the gas is passed through a second water tower (not shown) whereat the temperature of the gas is dropped to slightly less than 100° F.

In the design shown for exothermic generator 10 in FIG. 1, the products of combustion immediately impact and exchange heat with a cool water sump 23. The gas then flows upwardly through an annular packed bed 25 of refractory particles through which a water spray flows downwardly thus further cooling the product gas before exiting exothermic generator 10 at outlet 26. Packed bed 25 also serves to cool refractory block 17. The product gas is then passed through a water cooling tower where its temperature is reduced to a dew point of about 100° F. At that temperature the product gas may be used in the heat treat furnace (not shown).

Depending on the heat treat processes, product gas composition may have to be refined further to have a lower dew point. In such instances, the product gas is typically passed over refrigeration coils indicated by block 28 in FIG. 2 where its dew point is lowered to about 40° F. The prior art conventional refrigeration system could not cool the product gas lower than a dew point of 40° F. and still operate continuously because of ice build up. Again, reference should be had to the Background discussion and the table set forth in the Background for a showing of how the product gas composition varies when the product gas dew point is lowered from 100° F. to 40° F.

Those skilled in the art will understand that the water vapor composition of the products of combustion are typically in a range of about 12%–15% when the products of combustion are formed in combustion chamber 20 at air fuel ratios of anywhere from 5 to 7 parts air to one part natural gas up to stoichiometric. Those skilled in the art also understand that the components of the product gas will always seek to establish equilibrium at whatever temperature the gas is at and that reactions between the gas compounds which make up the product gas will, in turn, determine the final composition of the product gas at whatever temperature the gas is at. (Still further, depending upon the rate of the reactions, additional gaseous reactions attributed to the kinetics of the equilibrium reactions will occur). As will be discussed later, it is possible, depending on the dew point, to produce a gas composition suitable as a furnace atmosphere for certain select heat treat operations which otherwise have to be supplied from other sources, i.e., bottled gas, at considerably more expense than the gas produced by a gas generator. Further, those skilled in the art understand that the furnace atmosphere produced by the gas generator controls the heat treat process and in many instances provides the elements in gaseous form which reacts with the surface of the ferrous or non ferrous work pieces at elevated temperatures to impart the desired chemical composition to the work pieces.

In the initial unit tested, the cooling system of the present invention was simply added to the conventional FIG. 2 prior art system as an additional item downstream of conventional refrigerant system 28. However, in accordance with the preferred embodiment of the invention, the conventional refrigeration system 28 of the prior art is replaced by the cooling system of the present invention which has, as one of its distinguishing features, the ability to cool the product gas below the freezing temperature of water. Still further, should the system of the invention be added as an additional item downstream of conventional refrigeration system 28, it would probably be sized to lower the dew point to super low dew points of about 0° F. In the preferred embodiment conventional refrigeration system 28 is replaced by the drying system of the present invention to lower the temperature from a dew point of 100° F. to a dew point of about 20° F. Since the cost of the drying system of the present invention is not significantly different from conventional refrigeration system 28, the cost of the entire generator/drying system remains about the same.

Figure 3:
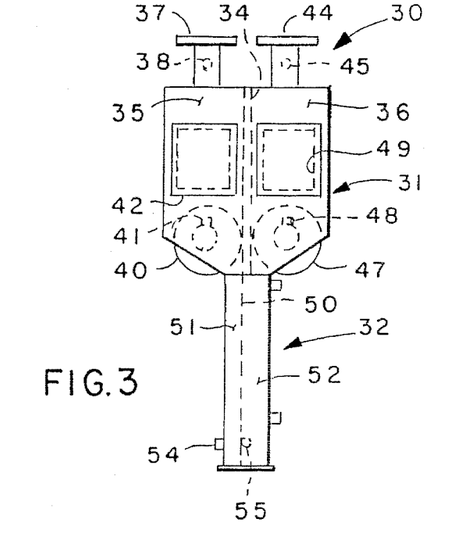
FIG. 3 is a front view of the cooling tank of the present invention.
Figure 4:
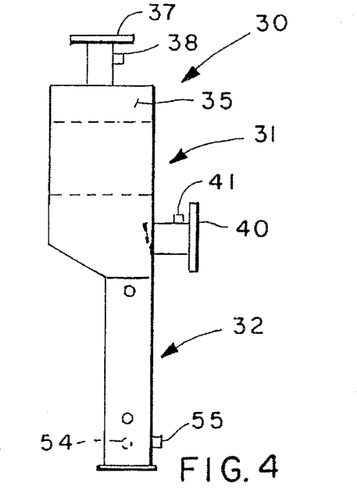
FIG. 4 is a side view of the cooling tank.
Figure 5:
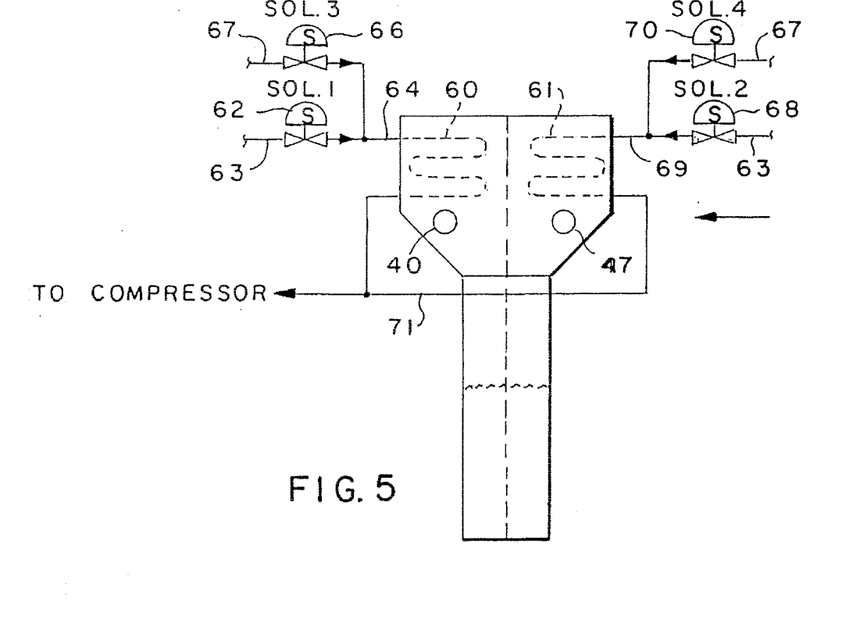
FIG. 5 is a piping schematic view showing the valving and refrigerant flow through the evaporator coils.

The entire cooling system of the present invention is physically mounted on or attached to a cooling tank 30 of a unique design perhaps best shown in FIGS. 3 and 4. Cooling tank 30 is hollow and can be described as having an upper half 31 which opens to or is in fluid communication with a lower sump half 32. Upper half 31 is divided by insulated wall 34 into a sealed first compartment 35 and a sealed second compartment 36. Both compartments 35, 36 open to lower sump half 32. First compartment 35 has i) a first inlet 37 which includes a smaller first bleed inlet 38, ii) a first gas outlet 40 which includes a smaller first bleed outlet 41 and iii) an insulated first evaporator coil mounting 42. Similarly, second compartment 36 has a second gas inlet 44 which includes a smaller second bleed inlet 45, a second gas outlet 47 which includes a smaller second gas bleed outlet 48 and an insulated second evaporator coil mounting 49. Lower sump half 32 has a dividing wall 50 which in turn divides lower sump half 32 into a first sump chamber 51 and a second sump chamber 52. Water is maintained at the bottom of each sump chamber 51,52 by water inlet 54 and water outlet 55. As shown in FIG. 3, dividing wall 50 extends beneath water inlet 54 thus sealing first sump chamber 51 from second sump chamber 52. As shown in FIG. 5, a first evaporator coil 60 is mounted into insulated first evaporator coil mounting 42 and a second evaporator coil 61 is mounted into insulated second evaporator coil mounting 49.

Cooling tank 30 as thus described is a single unitary tank which functions as two separate independent tanks. The wet gas can enter first gas inlet 37 pass over first evaporator coil 60 and then travel either directly through first gas outlet 40 or to the bottom of first sump chamber 51 where it dead ends with the water and returns upward and back through first gas outlet 40. Similarly, wet gas can enter second gas inlet 44, pass through second evaporator coil 61 and travel to the bottom of second sump chamber 52 where it dead ends and is diverted back into second gas outlet 47. Still further, cooling tank 30 can, and for a short time does, operate with both inlets and outlets open. The water vapor condensed on evaporator coils 60 or 61 drips to the water sump at the bottom of first and second compartments 35, 36 and eventually flows out of the system through water outlet 55.

Those skilled in the art will recognize that two separate refrigeration systems could be applied to cooling tank 30 for cooling the wet gas to dew points less than the freezing temperature of water, i.e., 32° F. In such a system, first evaporator coil 60 supported by its own refrigeration components would initially be cooling the wet gas until ice buildup about the evaporator coils prevent first evaporator coil 60 from effectively drying the wet gas. At that time, the wet gas could be ported to second evaporator coil 61 which would then function to dry the wet gas. While second evaporator coil 61 would be drying the wet gas, first evaporator coil 60 would be undergoing a conventional defrost cycle. Such a refrigeration system could effectively work to dry product gas with dew points less than 32° F. However, the system would be cost prohibitive since two separate refrigeration systems including refrigeration components would have to be supplied for each evaporator.

The distinguishing characteristics of the present invention is that like cooling tank 30 (one tank providing the functions of two separate tanks), the invention uses one refrigeration system to cool the dry gas in a manner which would otherwise require two refrigeration units.

The basic refrigeration control arrangement is schematically illustrated in FIG. 5 where a first refrigerant solenoid valve 62 controls the flow of refrigerant in refrigerant line 63 into first evaporator inlet line 64. A first defrost solenoid valve 66 controls the flow of a heated refrigerant in defrost line 67 into first inlet line 64. Similarly, there is provided a second refrigerant solenoid valve 68 controlling the flow of fluid on refrigerant line 63 into second evaporator inlet line 69 and a second solenoid defrost valve 70 controls the flow of heated refrigerant in defrost line 67 to second evaporator inlet line 69. Both first and second evaporator coils 60, 61 exit or exhaust the refrigerant from within their coils to a common return line 71.

The refrigeration cycle, per se, is conventional. A conventional refrigerant, trade name R-22, is utilized in a refrigeration cycle, which is conventional in that the refrigerant as a gas leaving the evaporators is compressed (and in the process, heated) in a compressor and passed as a "heated refrigerant stream" to a water cooled condenser where it liquefies. The liquid refrigerant (hereafter "cooled refrigerant stream") then passes through a thermostatic expansion valve into the evaporator coils. When the liquid refrigerant undergoes its phase change to a gas, its temperature drops significantly to chill the evaporator coils. When the wet gas comes into contact with the cold coils, the water vapor condenses. This is the refrigeration cycle of the prior art shown in block 28 of FIG. 2 and used to continuously cool or dry the wet gas to dew points of about 40° F.

Figure 7:
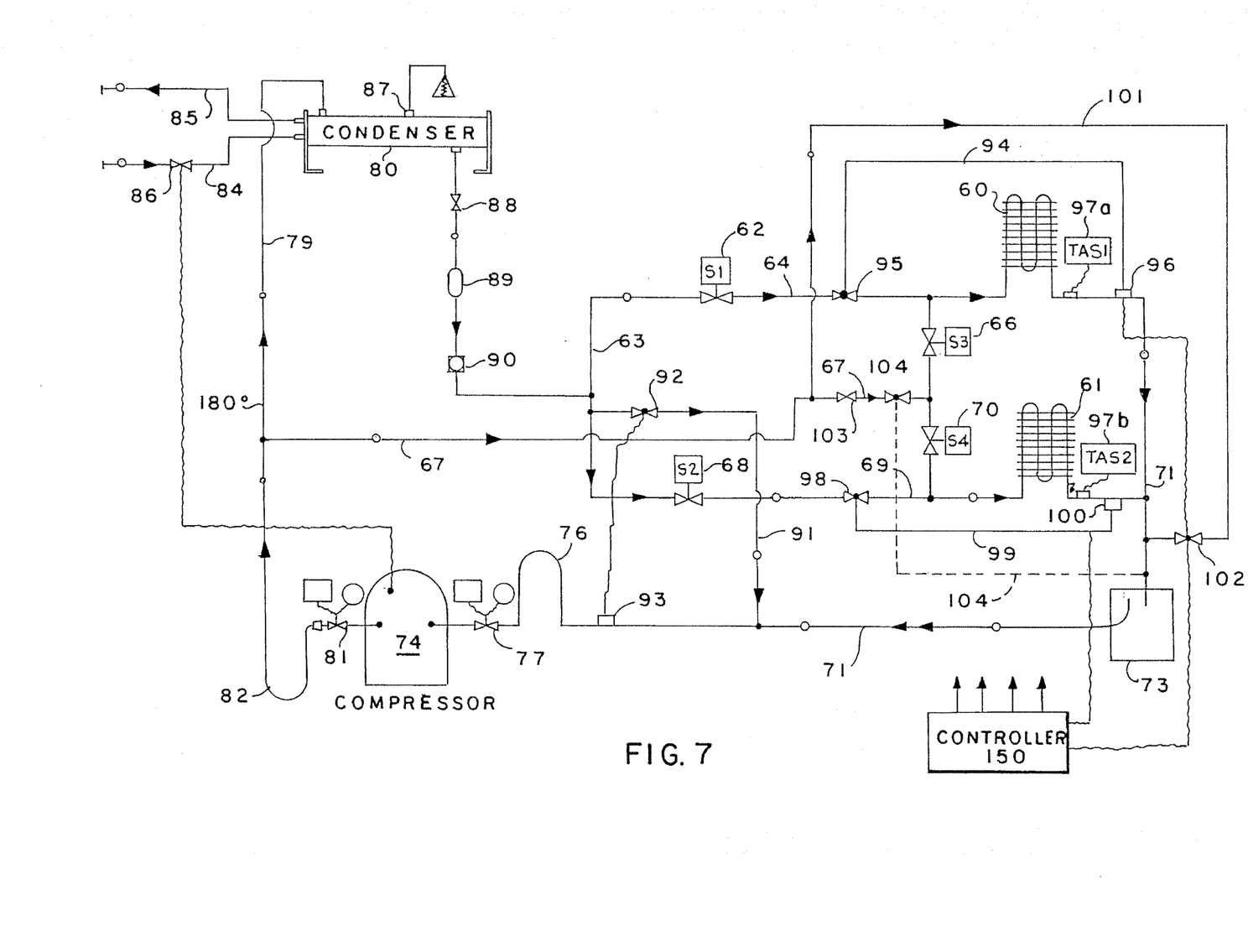
FIG. 7 is a piping schematic view of the refrigerant system employed in the present invention.

The refrigeration system of the present invention is shown in FIG. 7. The spent refrigerant in return line 71 collects in a suction accumulator 73 where it accumulates and is metered in a continuation of return line 71 to a compressor 74. Return line 71 is provided or formed, in part, as a vibration loop as at 76 and also has a service valve 77 installed therein should the compressor need servicing. The refrigerant gas is compressed in compressor 74 to a high pressure and in the course of compression, is heated to temperatures of about 180° F. The heated, compressed refrigerant gas then travels in condenser line 79 to a water cooled condenser 80. Condenser line 79 is also provided with a service valve 81 and fitted or formed, in part, as a vibration loop as at 82.

Condenser 80 liquefies the refrigerant and is controlled by the temperature and flow rate of shop supplied water ported into condenser 80 on a water inlet line 84 and exhausted from condenser 80 on a water outlet line 85. The flow of water through condenser 80 is controlled by a water regulating valve 86 which, in turn, is controlled by an electrical signal as shown generated by compressor 74 indicative of the refrigerant gas pressure developed in compressor 74. A conventional pressure relief valve 87 is provided for condenser 80. The condenser operation is entirely conventional.

The refrigerant now in liquid form exits condenser 80 on refrigerant line 63 where it "T's" and passes through first refrigerant solenoid valve 62 and second refrigerant solenoid valve 68. Refrigerant line 63 is provided with a service valve 88, a liquid line filtered drier 89, and a liquid line sight gas 90 as shown. Also "T'd" into refrigerant line 63 is a de-superheating line 91 which connects to return line 71. A de-superheating valve 92 controlled by a thermocouple 93 is positioned in return line 71 upstream of the point where de-superheating line 91 joins return line 71. Thermocouple 93 senses the temperature of the return refrigerant and controls de-superheating valve 92 to assure that the temperature of the spent refrigerant entering compressor 74 is constant.

Liquid refrigerant (i.e., the "cooled refrigerant stream") in refrigerant line 63 after passing through first refrigerant solenoid valve 62 enters first evaporator inlet line 64 and passes through a conventional first thermostatic expansion valve 95. First thermostatic expansion valve 95 is conventionally controlled through a first capillary line 94 by the temperature of the spent refrigerant determined by a "bulb" or a first thermocouple 96. For drawing clarity and ease of explanation purposes only, first thermocouple 96 is to be understood to also input its temperature reading to a first controller 97a, such as a Ranco temperature controller, positioned immediately downstream of first evaporator coil 60. First controller 97a functions as an on-off temperature controlled switch and in the preferred embodiment is actuated by its own thermocouple (not shown). It is to be understood that the entire system is basically monitored and controlled by the thermocouple measuring the temperature of the spent refrigerant, i.e., first thermocouple 96 shown as also controlling expansion valve 98 through first capillary line 94 (or the thermocouple in first controller 97a). The other sensors, that is, the de-superheating thermocouple 39 and the pressure valve in compressor 84, are set at constant levels which automatically keep the system in balance. The refrigeration cycle, as will be explained in detail below, is regulated by a master controller or programmable controller indicated by box 150 which, in turn, is overridden or advanced in logic sequence by the temperature measurement of the thermocouple in the return line immediately downstream of the evaporated coils. Similarly, the liquid refrigerant in refrigerant line 63 after passing through second refrigerant solenoid valve 68, enters second evaporator coil 61 after passing through second expansion valve 98, in turn, under the control of a second "bulb" or second thermocouple 100 controlling second expansion valve 98 through a second capillary line 99. A second temperature controller 97b operates as temperature responsive on-off switch and is identical to first temperature controller 97a.

As explained with reference to the description of FIG. 5, hot refrigerant gas at a temperature of approximately 180° F. is passed through defrost line 67 in fluid communication with condenser line 79 through first defrost solenoid valve 66 to first evaporator inlet line 64 and through second solenoid defrost valve 70 through second evaporator inlet line 69. T'd into defrost line 67 is a first bypass line 101 and the hot refrigerant gas in first bypass line 101 is controlled by suction pressure regulating valve 102 controlling the pressure in such an accumulator 73. Hot refrigerant gas flow in defrost line 67 is regulated by globe valve 103 and hot gas regulating valve 104 "T'd" to defrost line 67 by a second bypass line 104 in fluid communication with suction accumulator 73. Importantly, hot gas regulating valve 104 controls the temperature of the heated refrigerant in defrost line 67 so that the temperature of the heated refrigerant remains constant. Testing established that variations in the temperature of the heated refrigerant could produce significant and erratic dried gas temperature.

Those skilled in the art will recognize that the sensible or latent heat of the wet gas passing over the "active" evaporator coil is used to heat the refrigerant which heat is utilized in the defrost line 67. In operation, the refrigeration unit of the invention showed a marked decrease in water usage by condenser 80 when hot gas was used in the system. This results in utility savings. If condenser 80 was air cooled, then the fan drawing cooling air over the condenser would cycle less frequently or at shorter cycles resulting in electricity savings.

Figure 6:
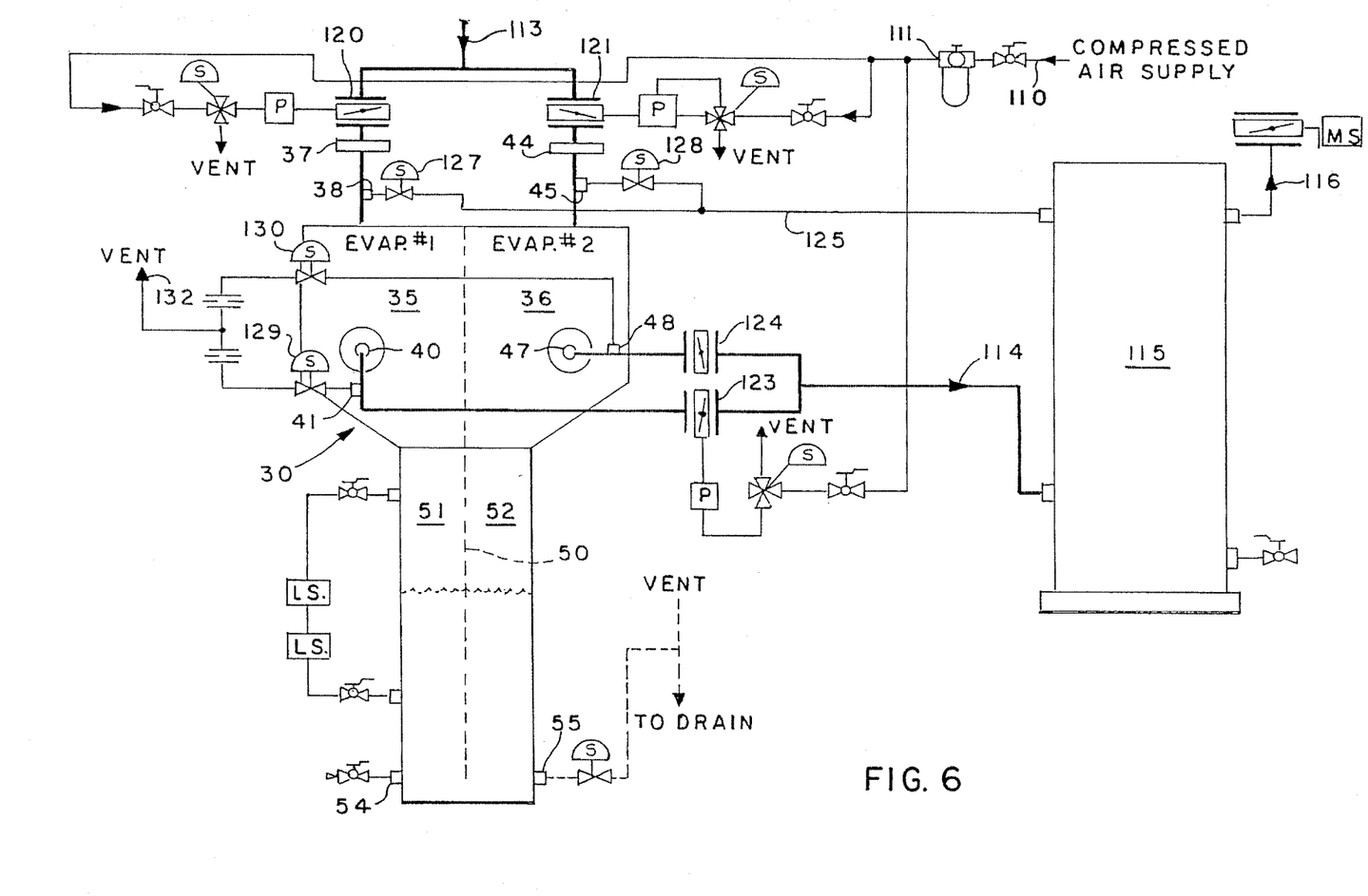
FIG. 6 is a piping schematic view showing the valving and flow of the wet gas through the cooling tank.

Referring now to FIG. 6, the valving arrangement controlling the flow of wet and dry gas through cooling tank 30 is disclosed. In the preferred embodiment, the valves are numerically operated by compressed air at plant pressure inputted on line 110 and controlled to desired pressure by regulator 111. The regulators and associated mechanism controlling each of the valves is entirely conventional, and while shown, will not be described to in detail or referred to further herein. It is understood that electrical valves could be substituted for the pneumatic valving arrangement shown.

Generally, the wet product gas introduced into cooling tank 30 is shown by the arrow indicated as reference numeral 113 and the dried product gas is shown by the arrow indicated as reference numeral 114 in FIG. 6. The dry product gas is collected in a buffer tank 115 and the outlet of buffer tank 115 indicated by the arrow designated as reference numeral 116 is transmitted to the heat treat furnace (not shown). A first inlet valve 120 controls the flow of wet gas to first compartment 35 and a second inlet valve 121 controls the flow of wet gas to second compartment 36. A first outlet valve 123 controls the flow of dried product gas from first compartment 35 and a second outlet valve 124 controls the flow of dried product gas from second compartment 36. In order to assist in the removal of ice buildup on the outside of the evaporator coils, a bleed line 125 from buffer tank 115 is provided to cooling tank 30. Those skilled in the art will understand that while the dew point of the dry product gas in buffer tank 115 is about 20° F., the actual temperature of the product gas is somewhat higher, typically in the range of 50° F. or so, and it has been found that circulating dry product gas about the outside of the evaporator coils will assist significantly in removal of the ice. A first bleed inlet valve 127 controls the flow of the dried product gas to first bleed inlet 38 and a second bleed inlet valve 128 controls the flow of dried product gas to second bleed inlet 45. Similarly, a first bleed outlet valve 129 controls the flow of any type of gas exiting first bleed outlet 41 from first compartment 35 and first bleed outlet valve 129 is vented to atmosphere or stack as at 132. Similarly, a second bleed outlet valve 130 controls the flow of any gas leaving second compartment 36 through gas bleed outlet 48 and thence to stack 132. All pneumatic valves are two position, on/off valves.

OPERATION

The drying cycle of the present invention can be defined as indefinitely performing a periodic cycle in which each cycle comprises a first phase followed by a second phase to complete the period followed again by the first phase and then by the second phase. In between each numbered phase is a changeover phase, the cycle going from the first phase through the changeover phase to the second phase and from the second phase through the changeover phase back to the first phase, etc. More specifically, in the first phase, one of the evaporators, in the preferred embodiment first evaporator 60, is "active" in the sense that it is operating to cool or dry the wet gas while the other evaporator, in the preferred embodiment second evaporator 61, is "inactive" in the sense that it is performing no cooling or drying function for the wet gas. In the second phase, the "inactive" evaporator, in the preferred embodiment second evaporator 61, becomes active while the active evaporator, in the preferred embodiment first evaporator 60, becomes inactive. Furthermore and in accordance with broader aspects of the invention and as an alternative embodiment, it is possible to perform the first phase-second phase cycle with more than two evaporators, specifically, a plurality of evaporators, say for example, three or four. In the alternative embodiment, one of the evaporators would be active and the others would be inactive and in various drying states and the system would sequentially switch the active evaporator from the first evaporator to the second evaporator and from the second evaporator to the third evaporator and from the third to the fourth, etc. until all the evaporators were switched sequentially from an inactive to an active to an inactive state whereupon the cycle would repeat. This alternative embodiment would be used where the product gas had to be dried to extremely low dew points, say for example, 0° F.

Referring still to the preferred embodiment, in the first phase, first refrigeration valve 62 is open and first expansion valve 95 is controlled by first thermocouple 96 measuring the temperature of the spent refrigerant after it leaves first evaporator coil 60 to control the temperature of evaporator coil 60, and accordingly, the dew point of the wet gas. This is, of course, conventional both in the basic refrigeration art and in the furnace gas generator art. Because the product gas is to be dried below the freezing point of water, ice will almost immediately begin to build up on evaporator coil 60 diminishing the efficiency of evaporator coils 60. That is, when ice completely envelopes the surface area of all the coils in first evaporator 60, the wet gas can only be dried or cooled to 32° F. Accordingly, it is necessary as the ice begins to accumulate on first evaporator coil 60 to further lower the temperature of the exposed portions of first evaporator coil 60 which are not covered by ice if the wet gas is to be consistently dried to a constant dew point. In theory, some type of special metering thermostatic valve could conceivably meter a stream of refrigerant gas to conceivably control, in a variable manner, the coil temperature in first evaporator 60. In practice, first thermostatic expansion valve 95 is an on/off metering device. The invention achieves control of the temperature of first evaporator coils 60 by bleeding a portion of the hot refrigerant gas at about 180° F. temperature into defrost line 67 through first defrost valve 66 to blend with the cold refrigerant gas thus raising the refrigerant temperature in the coils of first evaporator 60. As the ice begins to accumulate on the coils of first evaporator 60, the amount of the hot refrigerant metered into first evaporator inlet line 64 downstream of expansion valve 95 is decreased. As shown in the preferred embodiment, this decreased metering can be controlled by an on/off pulsing of solonoid valve, i.e., first defrost solonoid valve 66, or alternatively, a continuously vairable electronic metering valve can be employed. At some point ice will completely surround the coils necessitating a switch to the second phase of the cycle.

As noted, in the first phase, second evaporator 61 is inactive and it is in a defrost mode. Accordingly, second refrigeration valve 68 is closed and second defrost valve 70 is open to admit hot refrigerant gas in defrost line 67 into second evaporator inlet line 69. The heated refrigerant gas melts the ice buildup on the outside of the coils of second evaporator 61. However, as the time of the first phase come to an end, it is undesirable to have the coils in second evaporator 61 at an elevated temperature. This is desirable not only from the view point of thermal shock to the coils in second evaporator 61, but also because of the size or load capacity of compressor 74. Accordingly, second defrost valve 70 also pulses increasingly to a closed position and the duration of the pulsing cycle is controlled by second thermocouple 100. Thus, by the time that the drying cycle has progressed to the completion of first phase, second defrost valve 70 is in a closed position. As descirbed with reference to first defrost valve 66, the solonoid arrangement employed with second defrost valve 70 could be changed to a continuous electronic metering arrangement providing infinite control. This has been found to be unnecessary.

In the first phase, programmable controller 150 sets the valving for cooling tank 30 so that first inlet valve 120 and first outlet valve 123 are open and dry gas accumulates in buffer tank 115. Similarly, second inlet valve 121 and second outlet valve 124 are closed. However, second inlet bleed valve 128 is open and second outlet bleed valve 130 is also open to permit a small stream of dry gas to pass over the outside of the coils in second evaporator 61 and assist in the removal of ice buildup. As noted above, the dried gas is at a temperature of about 50° F. and is vented at second outlet bleed valve 130 to stack. The first inlet bleed valve 127 is closed as is the first outlet bleed valve 129.

At some point in the cycle, the ice buildup on first evaporator 60 starts to prevent efficient cooling of the dry gas while the ice buildup on second evaporator 61 has melted. In accordance with the broad aspect of the invention, the cycle is simply shifted from the first phase to the second phase. However, in accordance with a more specific and important feature of the inveniton, it was found that if the cycle was simply shifted from one numbered phase to the other numbered phase, a shock loading would be placed on compressor 74 and there would be some period of time during which the wet gas would not be cooled to the desired dew point of about 20° F. It was discovered, surprisingly, that if the cooled refrigerant was pulsed into the inactive evaporator for a set time period, a numbered phase shift could occur without experiencing any diminution in the ability of the system to maintain the desired dew point of the dried product gas while avoiding thermal shock to the refrigerant system. Accordingly, during the changeover phase for the periodic drying cycle as described thus far, first refrigerant valve 62 remains open and first defrost valve 66 is dosed while second refrigeration valve 68 pulses open at increasingly longer time increments and second defrost valve 70 is closed. At some point in the changeover phase, both first and second evaporator 60, 61 are active in that second inlet and outlet valves 121,124 are also opened in cooling tank 30 allowing both evaporators to go on line. With specific respect to cooling tank 30, first inlet valve 120 remains open and first outlet valve 123 remains open while first inlet bleed valve 127 is closed as is first outlet bleed valve 129. Dry product gas in first compartment 35 is thus processed and continues to be sent to buffer tank 115. At the onset of the changeover phase, second inlet bleed valve 128 closes and similarly, second outlet bleed valve 130 likewise closes. Second inlet valve 121, at some point in the changeover phase, moves from a closed to an open position, as does second outlet valve 124 while second refrigeration valve 68 is still pulsing.

At some predetermined time period in the changeover phase, verified by thermocouple 100, the changeover phase ends and the second phase of the drying cycle starts. In the second phase, first refrigeration valve 62 is closed and first defrost valve 66 is open and metering at a decreasing rate. Second refrigeration valve 68 is open and second defrost valve 70 is open but metering at decreasing rates to a closed position. The cooling tank valves have similarly flip-flopped. First inlet valve 120 and first outlet valve 123 are closed. First inlet bleed valve 127 and first outlet bleed valve 129 are open for cooling ice buildup now on the inactive first evaporator 60. The second inlet valve 121 is open as is the second outlet valve 124. Second inlet bleed valve 129 and second outlet bleed valve 130 are closed.

The defrost cycle described above is diagramed in the table set forth below.

|  | Refrigeration System | | Cooling tank | |
| --- | --- | --- | --- | --- |
| Drying Cycle | 1st evaporator 60 | 2nd evaporator 61 | 1st compartment 35 | 2nd compartment 36 |
| First Phase | 1st refrigeration valve 62 open. 1st defrost valve 66 pulsing to mete at decreasing rates to a closed position. | 2nd refrigeration valve 68 closed. 2nd defrost valve 70 open but pulsing close so that rate heat flow rate is decreasing. | 1st inlet valve 120 open. 1st inlet bleed valve 127 closed. 1st outlet valve 123 open. 1st outlet bleed valve 129 closed. | 2nd inlet valve 121 closed. 2nd inlet bleed valve 128 open. 2nd outlet valve 124 closed. 2nd outlet bleed valve 130 open. |
| Changeover Phase | 62 stays open. 66 closed | 68 pulses open to meter at increasing rates. 70 closed. | 120 open. 127 closed. 123 open. 129 closed. | 121 closed/open. 128 closed. 124 closed/open. 130 closed. |
| Second Phase | 62 closed. 66 open but pulsing to meter at decreasing rate. | 68 open. 70 open but pulsing to meter at decreasing heat flow rate. | 120 closed. 127 open. 123 closed. 129 open. | 121 open. 129 closed. 124 open. 130 closed. |

Figure 8:
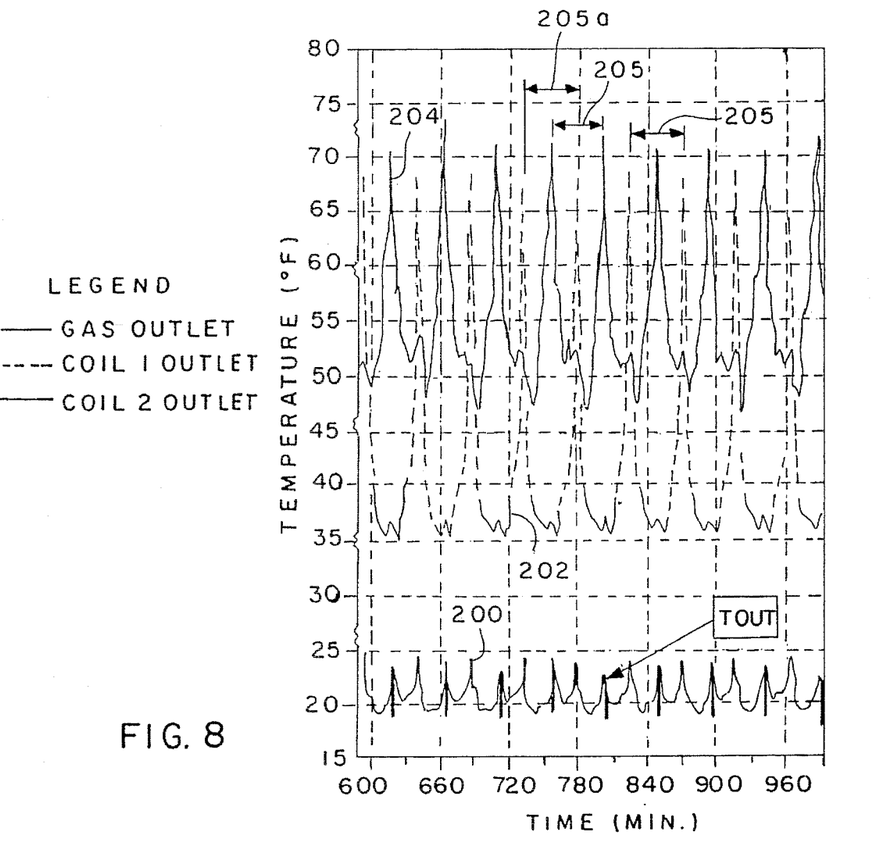
FIG. 8 is a graph of a test of the drying system of the present invention with temperature plotted on the ordinate and time on the abscissa showing refrigerant and drying gas temperatures for several refrigeration cycles.

Referring now to FIG. 8, there is shown a plot of a portion of test data obtained in which the temperature was continuously measured during drying system operation. Specifically, the test data shown was obtained over a five hour period starting with the 600th minute of operation and continuing to the 900th minute. The plot at the bottom portion of FIG. 8 represented by the reference numeral 200, shows dew point plotted on a y-axis in degrees Fahrenheit of the dried product gas during the five hour time period. Temperature variations stayed approximately within a 5° range of 20°–25° F. The dotted line plot in the upper portion of the graph represented by reference numeral 202 is the temperature of the refrigerant measured at the outlet of first evaporator 60. The solid line plot at the upper portion of FIG. 8 represented by reference numeral 204 is the temperature of the refrigerant measured adjacent the outlet of second evaporator coil 204. The period or the cycle is the time between adjacent peaks of either plots 204 or 202 and is represented by the reference numeral 205 in FIG. 8. Testing showed that the temperature of the hot gas in defrost line 67 mixed with the cold refrigerant through defrost valve 66 or 70 had a dramatic effect on system performance with slight changes in flow rates. An additional hot gas regulating valve 104 was added and tied or back loaded to thermocouples 96 or 100 and the pulsing durations were changed through master controller 150. Testing also established that defrost of the inactive evaporator was completed when the temperature of the refrigerant reached 65° F. and switches were added (not shown) to ensure that the cycle defrosted at this temperature. In fact, the defrost temperature was found to control the timing of the cycle phase shifts and not ice build up. Also, rather significantly, it was observed that when the duration of each phase was shortened, temperature of the wet product gas was more closely controlled. Specifically, when the duration of each phase was set at 1500 seconds, a variation between 18°–28° F. in temperature was observed. When the cycle was changed so that each phase lasted 1200 seconds, a more consistent result as shown in FIG. 8 was obtained. The total cycle time was thus established as about 44–45 minutes with 20 minutes for each numbered cycle phase and 4–5 minutes for the changeover.

Figure 9:
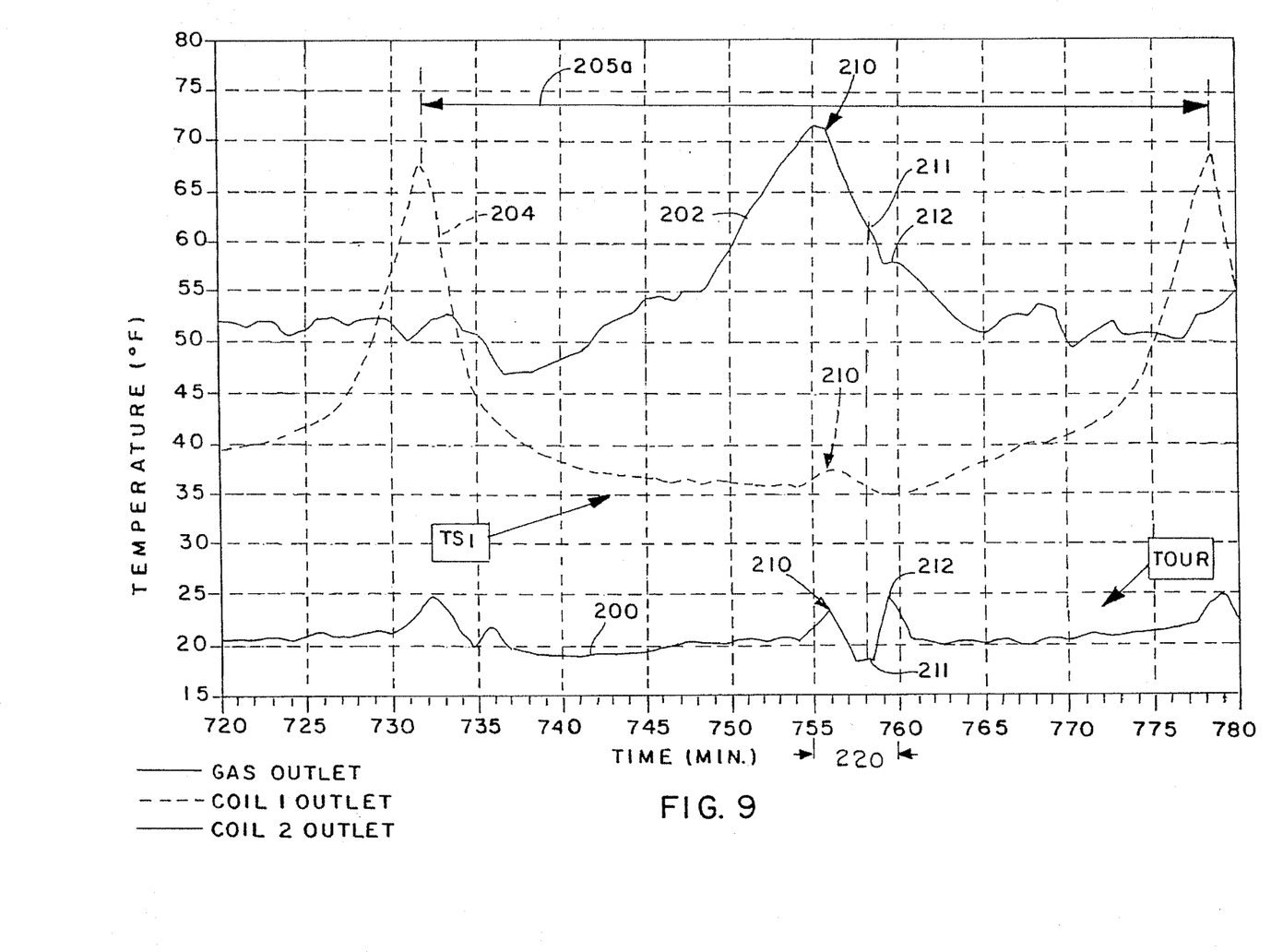
FIG. 9 is an enlarged portion of the graph shown in FIG. 8 illustrating the temperature change for one period of the refrigeration cycle.

This is best shown with reference to FIG. 9 in which the x-axis in FIG. 8 is expanded to show one complete cycle, specifically the cycle indicated by reference numeral 205a in FIG. 9. The active evaporator is shown as the dotted line designated by reference numeral 204 while the inactive evaporator for cycle 205a is shown by the solid line plot represented by reference numeral 202. As described, the inactive evaporator represented by plot 202 has heated refrigerant flowing through its coil in a pulsed manner by the opening and closing of defrost valve 66 or 70 and dried product gas flowing about the outside of its coil vis-a-vis bleed valve 127 or 128. As the ice melts, the temperature of the refrigerant of the inactive evaporator increases and when it reaches a set point, the changeover phase commences. As described, pulsing of cooled refrigerant through refrigeration valve 62 or 68 starts at about the position indicated by reference numeral 210 on plot 202 which reference numeral 210 is also shown on plot 200 for the dew point dry gas temperature. When some of the cold refrigerant in the active evaporator gets initially drawn or siphoned off, there occurs an almost expected temperature rise at the outlet of the active evaporator coil. As the pulsing continues, through the inactive evaporator, the outlet temperature of its refrigerant begins to drop, and at some point both evaporators are online. This is indicated by reference numeral 211 on plot 202 and 200. Both evaporators continue as being active with wet product gas flowing there over until the numbered phase switch over occurs and the next numbered phase starts as indicated by reference numeral 212 for plots 200 and 202. At that point, the next numbered phase of the cycle begins. The duration of the changeover phase is about 4–5 minutes as indicated by reference numeral 220 in FIG. 9. Significantly, the dew point of the dried product gas is retained relatively constant which could not be achieved if the numbered phases were simply switched. It is believed although not verified, that if the cycle were operated without a changeover phase, a substantially larger compressor would have to be used and even if a larger compressor were used overcoming the heat in the inactive compressor when switched to its online status might still result in an unacceptable rise in the dew point of the dry product gas until the heat buildup in the defrosted evaporator is overcome. By utilizing a changeover which pulses the refrigerant, the heat buildup in the inactive evaporator coils is dissipated without shocking the system.

As noted above, only two evaporators are utilized in the preferred embodiment. However, it is believed, based upon the test results, that substantially lower temperatures than dew points of 20° F. can be achieved with conventional refrigerants by simply shortening the cycle time of the numbered phases and using more than two evaporators. For example, if three evaporators were used, the cycle would progress from the first to the second to the third with two of the three evaporators being inactive and possibly, the changeover cycle being extended in time to result in a still further smoother transition. Thus, the first evaporator would be in a cooling mode while the second evaporator was in a changeover phase and the third evaporator was in the defrost phase. In this sequence, ice would not build up about a significant portion of the coil in the cooling phase thus resulting in a higher utilization efficiency of the active evaporator dropping dew points to lower temperatures.

While those skilled in the art will understand the workings of programmable controller 150 from the discussion above, it should nevertheless be noted that programmable controller 150 utilizes conventional ladder logic to control the entire cycle in a timed manner so that the refrigeration phrases described above regularly repeats itself on a counted timed basis. Should the temperature, as measured by first and second thermocouples 96, 100, of the refrigerant at points or benchmarks within the timed, periodic interval set by programmable controller 150 fall outside preset temperature ranges, first and second controllers 97a, 97b switch on or off to advance or retard the timing or sequencing of the ladder logic in programmable controller 150. As noted above, one of the controlling factors in the cycle was found to be the defrost temperature in the inactive evaporator. If the temperature of the refrigerant in the inactive evaporator exceeded a preset temperature, controller 97a or 97b is activated to advance the logic of programmable controller 150 to achieve a switch over to the next numbered cycle phase.

The invention has been specifically developed for use with an exothermic gas generator to develop a dry product gas for special heat treat furnace applications. One such typical application involves controlled decarburization of very low carbon steels. In such heat treat processes, carbon can be literally leeched out of the work piece case by the presence of oxygen in water vapor. Oxygen is released in the conventionally known water/gas shift reaction at elevated temperatures. By supplying very dry exothermic gases of the composition set forth in the table presented in the background discussion, the decarburization can be controlled. In some applications, after annealing, an oxide coating is desired to be imparted onto the case. The exothermic generator with its ability to supply lean as well as rich gas, can readily control this oxidation or "blueing" as it is conventionally known in the trade. Thus, the drying arrangement disclosed in this invention specifically enhances the utilization of an exothermic generator such as Surface Combustion's DX Generator and the invention specifically contemplates its use in combination with such generator. In this connection, dried product gases having the following compositions have been achieved with the present invention.

However, the invention in its broader applications is not limited to its use for developing special product gases for use in the heat treat furnace industry, but the invention can be applied to any application where a wet gas must be dried to a low dew point. Such applications exist in the food packing industry in that food, meat or cereal, must be packaged and sealed in moistureless packages. Similarly, applications requiring dry gas exist in the petroleum, the chemical and petrol chemical industries as well as in other industrial processes. The invention can be used to dry all such process gases.

The invention has been described with reference to a preferred and alternative embodiments. Modifications and alterations may suggest themselves to those skilled in the art upon reading and understanding the Detailed Description of the invention. It is intended to include all such modifications and alterations insofar as they come within the scope of the invention.

Having thus defined the invention, it is claimed:

1. A method for producing from a wet gas stream a continuous stream of dried gas having a dew point less than about 20° F. comprising the steps of:
  a) providing i) a single compressor for compressing a refrigerant gas to produce a compressed, heated refrigerant gas stream, ii) a condenser for liquefying said compressed heated refrigerant gas stream to produce a cooled refrigerant stream, iii) first and second evaporator coils with associated expansion valves, and iv) valves for porting said refrigerant streams between said evaporators and said wet gas stream over said evaporators;
  b) repeatedly performing a periodic, refrigeration cycle in which i) during a first phase of said cycle, said wet gas is passed over said first evaporator which functions as an active evaporator through which said cooled refrigerant stream passes for drying said wet gas passing over said first evaporator while a portion of said heated compressed refrigerant stream is passed through said second evaporator which is in an inactive state for defrosting same and ii) during a second phase of said cycle, said wet gas is ported over said second evaporator acting as an active evaporator through which said cooled, refrigerant stream passes for drying said wet gas while a portion of said heated compressed refrigerant in passed through said first evaporator functioning as an inactive evaporator for defrosting same;
  c) during each cycle phase metering a portion of said heated compressed refrigerant stream into said cooled refrigerant stream ported into said active evaporator, the metering rate of said heated refrigerant stream being periodically reduced from the beginning to the end of each cycle phase as ice accumulates on said active evaporator whereby said wet gas is continuously dried to a generally constant dew point throughout each portion of the cycle.

2. The method of claim 1 further including in step (c) metering said heated compressed refrigerant stream into said inactive evaporator at decreasing flow rates so that the internal temperature of the coils of said inactive evaporator does not increase to high temperatures prior to cycling said inactive evaporator to an active evaporator.

3. The method of claim 1 further including the step of performing a changeover phase before switching from one numbered phase to the other by i) stopping said flow of heated refrigerant stream through said inactive evaporator and ii) thereafter pulsing a portion of said cooled refrigerant stream through said inactive evaporator while maintaining the flow of said cooled refrigerant stream through said active evaporator for a first set time period at the end of which said inactive evaporator becomes active by porting said wet gas stream over and said cooled compressed refrigerant stream through said inactive evaporator while said active evaporator becomes inactive by receiving only a portion of said heated compressed refrigerant stream ported therethrough while said wet gas is no longer in contact therewith whereby said cycle is switched between numbered phases without causing variation in the dried temperature of the cooled gas.

4. The method of claim 3 wherein the time duration of said pulses in said changeover phase is periodically increased until said pulse becomes continuous at which time said wet gas no longer contacts the evaporator which was previously active, and at a second shorter time period within said changeover phase causing said wet gas to contact the inactive evaporator whereby both evaporators are on line prior to switching from one numbered phase to the other to maintain the drying temperature of the wet gas.

5. The method of claim 1 further including the step of directing a portion of said dried gas over the coils of the inactive evaporator during each numbered phase of said refrigeration cycle whereby ice is removed not only by heat transfer from within the coils of the inactive evaporator but also by moisture pick up from the dried gas circulating about the exterior of the coils of the inactive evaporator.

6. The method of claim 4 further including the step of directing a portion of said dried gas over the coils of the inactive evaporator during each numbered phase of said refrigeration cycle whereby ice is removed not only by heat transfer from within the coils of the inactive evaporator but also by moisture pick up from the dried gas circulating about the exterior of the coils of the inactive evaporator.

7. The method of claim 6 further including in step (c) metering said heated compressed refrigerant stream into said inactive evaporator at decreasing flow rates so that the internal temperature of the coils of said inactive evaporator does not increase to high temperatures prior to cycling said inactive evaporator to an active evaporator.

8. The method of claim 7 wherein the numbered phase said cycle is controlled by sensing the temperature of the refrigerant stream immediately downstream of each evaporator and controlling the metering of said heated compressed refrigerant stream in response thereto.

9. The method of claim 8 further including the step of controlling the pulsing of said cooled, compressed refrigerant stream and the porting of said wet gas stream from one evaporator to the other in response to the sensed temperature resulting in a stable and responsive control system.

10. The method of claim 5 further including the step of venting said dried gas after it has contacted the coils in said inactive evaporator.

11. The method of claim 9 wherein said evaporator has coils contained in a sealed enclosure open to a water sump and an exit port on one side and an inlet port on the other side, said wet gas passing over said coils in said enclosure to become dried gas and thereafter contacting said water sump before passing through said exit port without experiencing any adverse increase in dew point.

12. The method of claim 1 further including at least a third evaporator, said refrigeration cycle proceeding to activate only one of said evaporators in sequential order, the other evaporators being inactive and remaining in said defrost mode until said changeover phase is selected.

13. A method for producing a gas dried to a low dew point suitable for use as the furnace atmosphere in an industrial heat treat process, said method comprising the steps of:

a) reacting air with a combustible hydrocarbon gas at a set ratio in a gas generator to produce a wet gas having a desired gas composition including water vapor and immediately drying said wet gas to a dew point of about 100° F.;

b) providing i) a compressor for compressing a refrigerant gas to produce a compressed, heated refrigerant gas stream, ii) a condenser for liquefying said compressed heated refrigerant gas stream to produce a cooled refrigerant stream iii) first and second evaporator coils, each having associated expansion valves, and iv) valves for porting said refrigerant streams between said evaporators and said wet gas over said evaporators;

c) repeatedly performing a periodic, refrigeration cycle in which i) during a first phase of said cycle wet gas is passed over said first evaporator functioning as an active evaporator through which said cooled refrigerant stream passes for drying said wet gas to dew points less than 32° F. while a portion of said heated compressed refrigerant stream is passed through said second evaporator functioning as an inactive evaporator for defrosting same, and ii) during a second phase of said cycle said wet gas is passed over said second evaporator coil acting as an active evaporator through which said cooled, refrigerant stream passes for drying said wet gas to dew points less than 32° F. while a portion of said heated, compressed refrigerant is passed thorough said first evaporator for defrosting same whereby the sensible heat of said wet gas is utilized by said refrigeration cycle to defrost said inactive evaporator.

14. The method of claim 13 further including the step, during each cycle phase, of metering a portion of said heated, compressed refrigerant stream into said steam of cooled refrigerant at a decreasing rate during the time said cooled refrigerant stream is utilized by said active evaporator whereby the efficiency of said active evaporator is increased to compensate for ice buildup on the evaporator coils to maintain the dew point of said dried gas at a set value while simultaneously metering said heated compressed refrigerant stream into said inactive evaporator at decreasing flow rates so that the internal temperature of the coils of said inactive evaporator does not increase to high temperatures prior to switching said inactive evaporator to an active evaporator.

15. The method of claim 14 further including the step of performing a changeover phase before switching from one numbered phase to the other by i) stopping said flow of heated refrigerant stream through said inactive evaporator and ii) thereafter pulsing a portion of said cooled refrigerant stream through said inactive evaporator while maintaining the flow of said cooled refrigerant stream through said active evaporator for a first set time period at the end of which said inactive evaporator becomes active by porting said wet gas stream over and said cooled compressed refrigerant stream through said inactive evaporator while said active evaporator becomes inactive by receiving only a portion of said heated compressed refrigerant stream ported therethrough while said wet gas is no longer in contact therewith whereby said cycle is switched between numbered phases without causing variation in the dried temperature of the cooled gas.

16. The method of claim 15 wherein the time duration of said pulses in said changeover phase is periodically increased until said pulse becomes continuous at which time said wet gas no longer contacts the evaporator which was previously active, and at a second shorter time period within said changeover phase causing said wet gas to contact the inactive evaporator whereby both evaporators are on line prior to switching from one numbered phase to the other to maintain the drying temperature of the wet gas.

17. The method of claim 16 further including the steps of collecting said dried gas in a storage tank prior to use in said heat treat process, directing a portion of said dried gas from said storage tank to pass over the coils of said inactive evaporator whereby removal of ice from the inactive evaporator during defrost is further assisted.

18. The method of claim 17, wherein said dried gas after passing over the ice buildup on the coils of said inactive evaporator is vented from the system.

19. Apparatus for drying wet gases having dew points in excess of about 40° F. to dry gases having a dew point less than 32° F. comprising:

a) a refrigeration system including a i) compressor for compressing a refrigerant gas to a heated, compressed refrigerant gas, ii) a condenser in fluid communication with said compressor for condensing said heated refrigerant gas to a cooled, condensed refrigerant, iii) first and second evaporators with associated expansion valves for drying said wet gas, and iv) refrigerant valve means for selectively porting said heated compressed refrigerant and said condensed refrigerant to said evaporators;

b) a cooling tank having first and second compartments, each with an inlet and outlet and insulated from one another and in which said first and second evaporators, respectively, are disposed, each compartment having cooling tank valve means controlling which compartment and its associated evaporator receives said wet gas;

c) control means regulating said cooling tank valve means and said refrigeration valve means for repeatedly performing a periodic refrigeration cycle in which i) during a first phase of said cycle wet gas is passed over said first evaporator functioning as an active evaporator through which said cooed refrigerant stream passes for drying said wet gas to a dew point less than 32° F. while a portion of said heated compressed refrigerant stream is passed through said second evaporator functioning as an inactive evaporator for defrosting same, and ii) during a second phase of said cycle said wet gas is passed over said second evaporator coil acting as an active evaporator through which said cooled, refrigerant stream passes while a portion of said heated, compressed refrigerant is passed through said first evaporator for defrosting same whereby the sensible heat of said wet gas is utilized by said refrigeration cycle to defrost said inactive evaporator.

20. Apparatus of claim 19 further including said refrigeration system having a refrigerant conduit containing said expansion valves between said condenser and said evaporators; a defrost conduit downstream of said compressor and upstream of said condenser in fluid communication with said first and second evaporators downstream of each evaporator's expansion valve; said refrigerant valve means including refrigerant valves in said refrigerant conduit and defrost valves in said defrost conduit, all regulated by said control means; said control means effective to port said heated compressed refrigerant at decreasing rates through said inactive evaporator for defrosting same while metering a portion of said heated compressed refrigerant into said cooled refrigerant of said active evaporator at a rate which decreases over the time period said active evaporator is cooling said wet gas said decreasing rate being correlated to the ice buildup on the coils of said active evaporator so that the dew point of the dried gas remains relatively constant throughout the cycle.

21. Apparatus of claim 20 further including a hot regulating valve in said defrost conduit upstream of said defrost valves for controlling the temperature of said heated refrigerant gas in said defrost conduit to a set temperature.

22. Apparatus of claim 21 further including temperature means sensing the temperature of said refrigerant after said refrigerant leaves said active evaporator, said control means metering said heated compressed refrigerant to said active evaporator in response to the temperature sensed by said temperature means.

23. Apparatus of claim 22 wherein said control means causes a changeover phase before switching from one numbered cycled phase to the other by regulating said defrost valves to stop the flow of said heated refrigerant stream through said inactive evaporator and thereafter pulsing a portion of said cooled refrigerant stream through said inactive evaporator while maintaining the flow of said cooled refrigerant stream through said active evaporator for a set time period before causing said cycle to switch from one numbered phase to another whereby said cycle is switched between numbered phases without causing variation in the dried temperature of the cooled gas.

24. Apparatus of claim 23 wherein said control means causes the time duration of said pulses in said changeover phase is periodically increased until said pulse becomes continuous at which time said wet gas no longer contacts the evaporator which was previously active, and at a second shorter time period within said changeover phase causing said wet gas to contact the inactive evaporator whereby both evaporators are on line prior to switching from one numbered phase to the other to maintain the drying temperature of the wet gas.

25. Apparatus of claim 24 further including a buffer tank in fluid communication with said outlets of said cooling tank for storing a quantity of said dried gas, said buffer tank in valved fluid communication with said inlets of said cooling tank, said control means effective to cause a portion of said dried gas in said buffer tank to pass through that inlet in fluid communication with an inactive evaporator for removing ice buildup.

26. Apparatus of claim 25 further including said cooling tank having a common sump beneath said compartments for collecting water condensed from said evaporator coils; a partition extending between said compartments into said sump dividing said cooling tank into two separate passages beneath said evaporators and vent valve means in fluid communication with said cooling tank outlets for venting gas from said outlet; said vent valve means controlled by said control means to vent only dried gas from said buffer tank after said dried gas passes over said inactive evaporator.

* * * * *